United States Patent
Patel

(10) Patent No.: US 12,017,516 B2
(45) Date of Patent: Jun. 25, 2024

(54) INTERIOR WINDOW SUNSHADE CONFIGURATIONS

(71) Applicant: Rohan Vishnubhai Patel, Bensalem, PA (US)

(72) Inventor: Rohan Vishnubhai Patel, Bensalem, PA (US)

( * ) Notice: Subject to any disclaimer, the term of this patent is extended or adjusted under 35 U.S.C. 154(b) by 182 days.

(21) Appl. No.: 17/385,827

(22) Filed: Jul. 26, 2021

(65) Prior Publication Data

US 2021/0387511 A1    Dec. 16, 2021

Related U.S. Application Data

(63) Continuation-in-part of application No. 17/019,436, filed on Sep. 14, 2020, now abandoned.

(60) Provisional application No. 63/037,665, filed on Jun. 11, 2020.

(51) Int. Cl.
  *B60J 1/20*    (2006.01)

(52) U.S. Cl.
  CPC .................. *B60J 1/2091* (2013.01)

(58) Field of Classification Search
  CPC . B60J 1/2091; B60J 1/2094; B60J 1/20; B60J 1/2011; B60J 1/2047; B60J 1/2077; E06B 9/24; E06B 2009/2488; E06B 2009/2494; B25B 27/146; B65B 13/34; B65B 13/345; Y10T 24/148
  See application file for complete search history.

(56) References Cited

U.S. PATENT DOCUMENTS

| | | | | |
|---|---|---|---|---|
| 440,999 A * | 11/1890 | Frost | ........................ | B65D 9/34 24/20 R |
| 1,727,896 A * | 9/1929 | Mraz | ..................... | H01R 43/058 24/23 W |
| 1,736,688 A * | 11/1929 | Yerby | ..................... | B60J 1/2011 160/40 |
| 2,917,569 A * | 12/1959 | Robert, Jr. | ............... | H01R 4/20 174/84 R |
| 3,899,818 A * | 8/1975 | Castaneda | ................. | B23P 6/00 140/93.4 |
| 4,815,784 A * | 3/1989 | Zheng | ..................... | B60J 1/2091 160/329 |
| 5,024,262 A * | 6/1991 | Huang | ..................... | B60J 11/08 160/329 |
| 5,116,273 A * | 5/1992 | Chan | ...................... | A45B 23/00 160/370.21 |
| 5,553,908 A * | 9/1996 | Shink | ....................... | B60J 11/08 160/370.21 |
| 5,575,324 A * | 11/1996 | Hwang | .................. | B60J 1/2091 160/370.21 |
| 5,632,318 A * | 5/1997 | Wang | ..................... | B60J 1/2091 160/368.1 |

(Continued)

OTHER PUBLICATIONS

Covercraft, UVS100 Custom Sunscreen, Jul. 2016, retrieved from https://www.covercraft.com/us/en/product/uvs100-custom-sunscreen. UV?gclid= EAIaIQobChMlhYnujpz68wlVDI3ICh3TbAfjEAAYASAAEgKdO_D_BwE (Year: 2016).*

*Primary Examiner* — Abe Massad

(57) ABSTRACT

Disclosed is an improved interior window sunshade for a window of a building and/or an automobile window. The interior window sunshade comprises a flexible flat wire loop member secured to a fabric. The flexible flat wire loop member comprises flexible arch on one or more sides of the flexible flat wire loop member.

20 Claims, 16 Drawing Sheets

(56) References Cited

U.S. PATENT DOCUMENTS

| | | | | |
|---|---|---|---|---|
| 5,785,106 | A * | 7/1998 | Hwang | B60J 1/2091 |
| | | | | 160/370.21 |
| 5,845,697 | A * | 12/1998 | Zheng | E04H 15/40 |
| | | | | 160/370.21 |
| 7,121,315 | B2 * | 10/2006 | Ly | B60J 1/2011 |
| | | | | 160/105 |
| 8,342,226 | B2 * | 1/2013 | Zheng | B60J 1/2011 |
| | | | | 160/370.21 |
| D886,696 | S * | 6/2020 | Holt | D12/183 |
| 2017/0113519 | A1* | 4/2017 | Gong | B60J 1/2011 |
| 2019/0084382 | A1* | 3/2019 | Patel | B60J 1/2091 |
| 2019/0108569 | A1* | 4/2019 | Patel | G06F 3/0482 |
| 2019/0118623 | A1* | 4/2019 | Patel | B60J 1/2091 |
| 2019/0248217 | A1* | 8/2019 | Newton | B60J 1/2091 |

\* cited by examiner

1205

| Model | Size |
|---|---|
| Ford – Continued | |
| Ranger – US (2019-2025) | L |
| Ranger – US (1983-2013) | S |
| Taurus (1996-2018) | L |
| Taurus (1986-1995) | M |
| Tbird (1989-1997) | L |
| Thunderbird (2002-2005) | S |
| Transit (2012-2025) | XXL |
| TransitConn (2007-2025) | XXL |
| Windstar (1995-2003) | XXL |

INTERIOR WINDOW SUNSHADE CONFIGURATIONS

CROSS-REFERENCE TO RELATED APPLICATIONS

This application is a continuation-in-part of non-provisional application Ser. No. 17/019,436 filed on Sep. 14, 2020. Ser. No. 17/019,436 application claims priority of provisional application 63/037,665 filed on 11 Jun. 2020.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of the Invention

The present invention relates to interior window sunshades with a support loop member sewn on a fabric. Conventionally the sunshade is made by sewing round support loop members. The fitment of a sunshade can be improved by adding a few features to provide maximum flexibility to fit various dimensions of automobile windows and provide the optimum coverage possible. The common issue the present configuration has is not enough support for a fabric to stay in place around the corners of an automobile window. The current invention also solves the issue of the loop member hitting the rear view mirror during an installation in an automobile window.

BRIEF SUMMARY OF THE INVENTION

It should be understood that this disclosure is not limited to the particular systems, and methodologies described herein, as there can be multiple possible embodiments of the present disclosure which are not expressly illustrated in the present disclosure. It is also to be understood that the terminology used in the description is to describe the particular versions or embodiments only, and is not intended to limit the scope of the present disclosure.

The present invention is directed to providing an improved sunshade fitment by having various shaped support loop member that provides optimum coverage to a window. The shapes of the loop member can be configured to provide maximum flexibility for the loop-member. The added flexibility of a loop member in the sunshades assures proper fitment in various sizes of automobile windows. With the added flexibility of a loop member overall sizes can be reduced without compromising the fitment of a car sunshade. This sunshade configuration also can be used to provide shading for household windows.

BRIEF DESCRIPTION OF THE DRAWINGS

For a complete understanding of the present invention, reference is now made to the following descriptions taken in conjunction with the accompanying drawing, which:

FIG. 12 illustrates another embodiment of a size guidance chart for providing compatibility guidance of the interior windows sunshade.

DETAILED DESCRIPTION OF THE INVENTION

Embodiments of the present disclosure will be described more fully hereinafter with reference to the accompanying drawings in which like numerals represent elements throughout several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
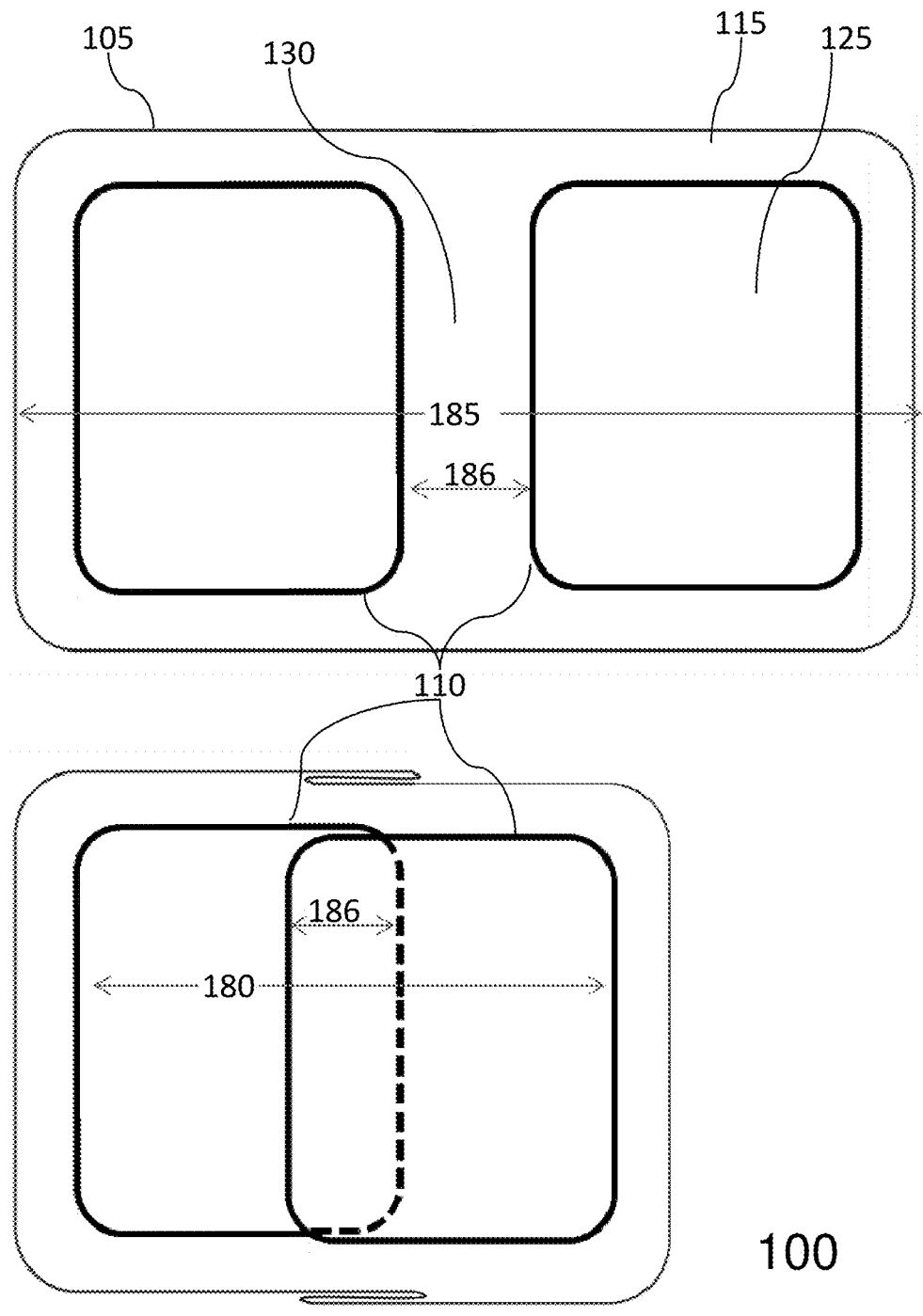
FIG. 1 illustrates a sunshade configuration with two loop members sewn on a substantially rectangular fabric in an extended and overlapped position.

As shown in FIG. 1 a sunshade 100 is formed by a pair of resilient loop members 110 that are substantially rectangular shaped. The flexible loop members are sewn on a substantially rectangular fabric 105. Each of the two loop members are conjoined using the same fabric at a fabric-hinge 130. The looped structure helps the fabric stay erect against a glass window of any kind and helps block sunlight coming inside. The sunshade configuration 100 can comprise a reflective insulating material to block the sun's rays or mesh-like material to allow air flow but block bugs from passing through the fabric. The additional loose fabric border 105 is additional fabric on a top, a bottom, and an outer side of each of the two flexible steel flat wire loop members. The additional loose fabric is present on the top and the bottom of the fabric-hinge 130. The fabric inside each of the two flexible loop members is erected-fabric 125 which is under tension by each of the two flexible steel flat wire loop members respectively.

Although the loop members 110 are described as formed of flexible metal and other resilient materials such as steel, plastics, and spring may be used. The term fabric is to be given its broadest meaning and may include woven/non-woven fabrics, sheet fabrics, or even films.

Each of the two flexible steel flat wire loop members 110 illustrated in the sunshade embodiment 100 has at least 4 sides and 4 corners, a first side being the bottom side, a second side being an inner side that is connected to the fabric-hinge 130, a third side being the top side and a fourth side being outer side of each of the two flexible steel flat wire loop members. The loop members 110 being substantially rectangular, the sunshade configuration 100 can provide better coverage by keeping the fabric it's sewn upon erect in the corners. Both the loop members 110 are conjoined with a fabric-hinge 130 that also provides sun blockage in the area between two loop members 110. The border 115 provides coverage to an area outside the loop members 110.

A maximum width of the sunshade 100 is marked as 185 with the fabric-hinge width 186, wherein the fabric-hinge is a distance between the two flexible flat wire loop members. A minimum width of the sunshade is marked as 180 which is a distance between the outer vertical sides of the two flexible loop members when the fabric-hinge 186 folded.

Figure 2:
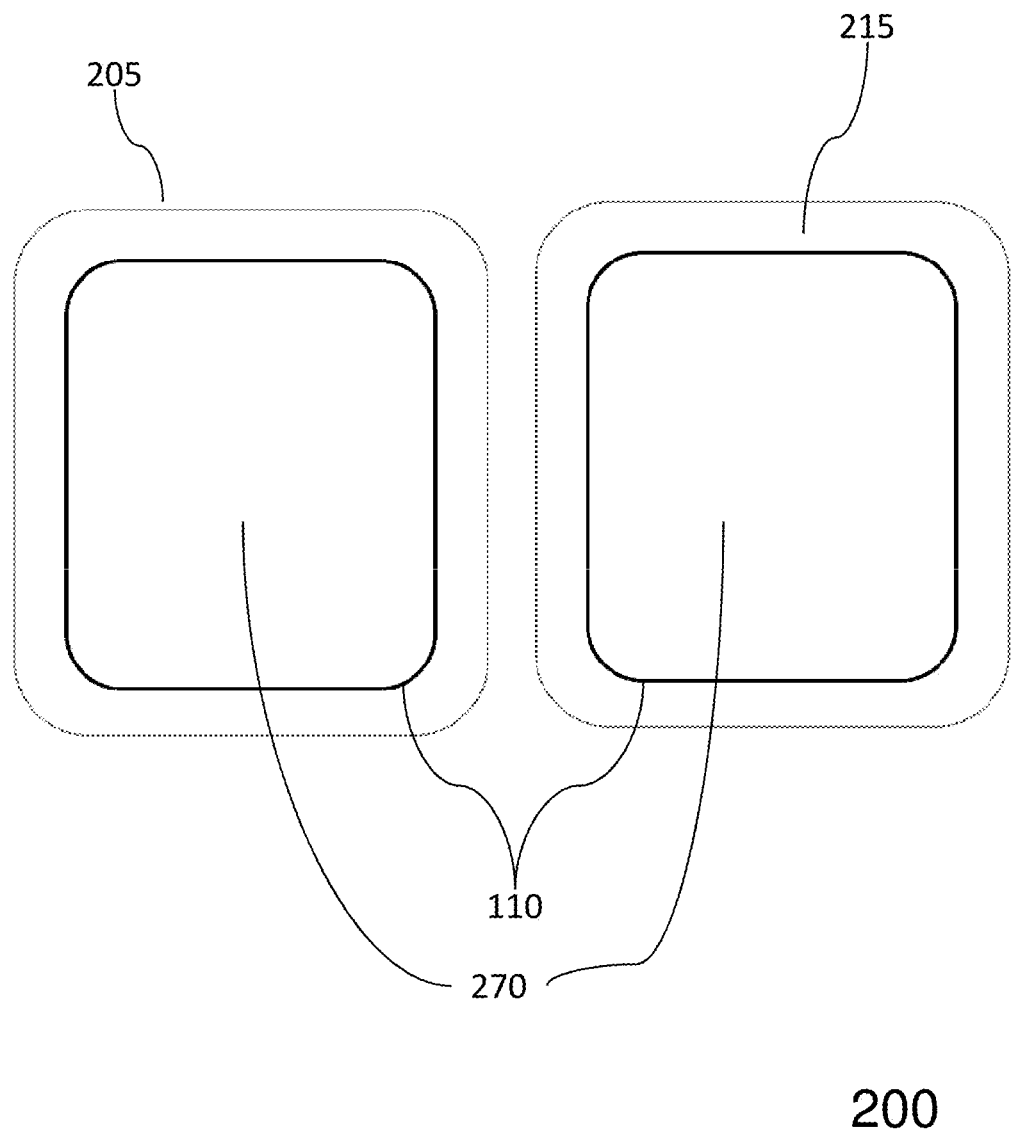
FIG. 2 illustrates a sunshade configuration with one of two substantially rectangular-shaped loop members sewn on one of two pieces of substantially rectangular fabric.

FIG. 2 illustrates a sunshade 200 wherein each of two substantially rectangular loop members 110 is sewn on one of two substantially rectangular fabric pieces 205. In this sunshade configuration 200, each of the two flexible steel flat wires loop members has an additional loose fabric border 215 outside of each of the two flexible steel wire loop members. The fabric inside is an erect fabric 270 supported by one of the two flexible steel flat wire loop members.

Figure 3:
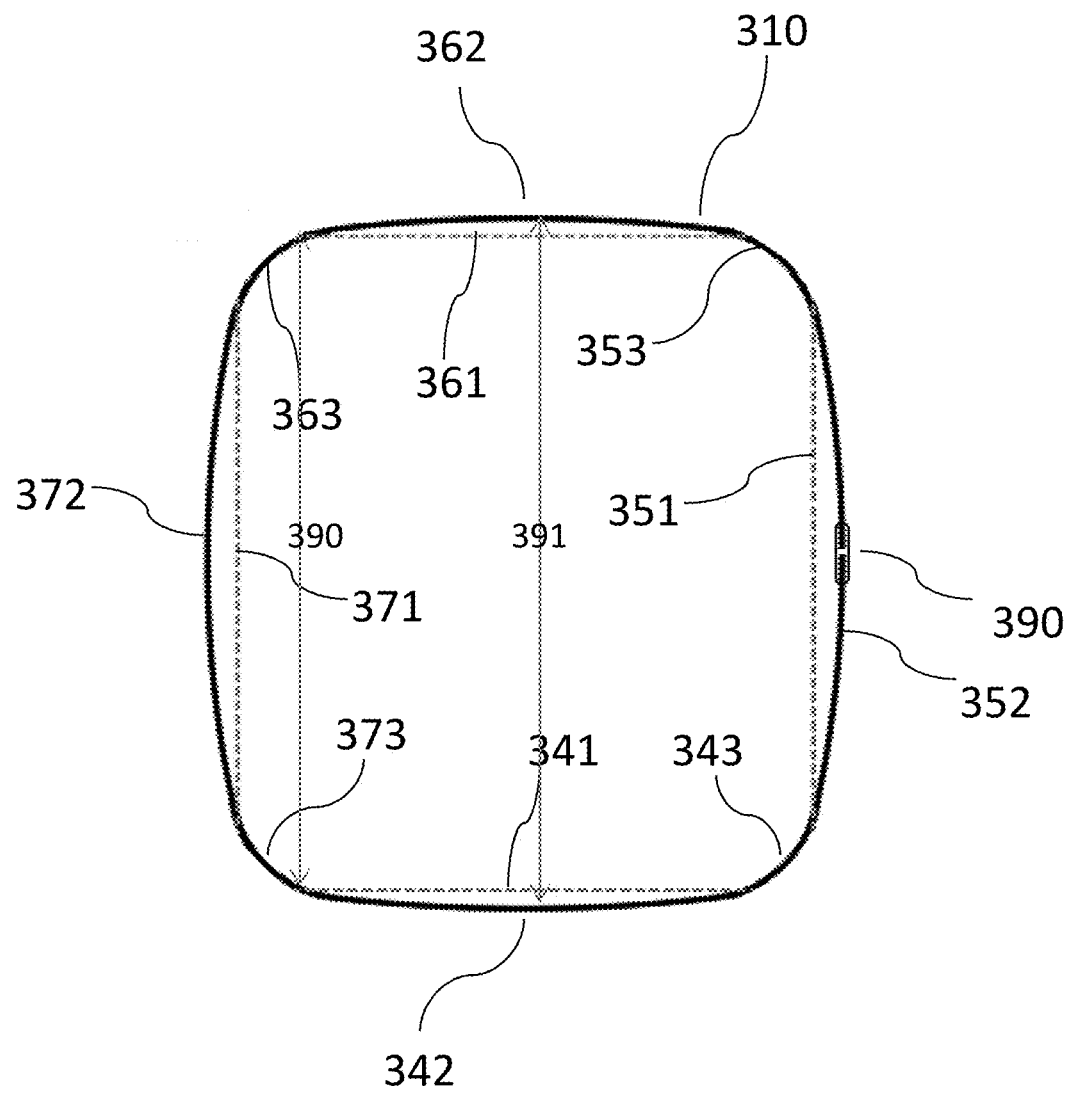
FIG. 3 illustrates a sunshade with a substantially rectangular-shaped loop member sewn on a rectangular fabric. The four sides of the substantially rectangular-shaped loop member are substantially straight or arched outward slightly to provide more flexibility.

FIG. 3 illustrates substantially rectangular loop members 310 in embodiment 300 to be used with sunshade configuration 100 and/or 200. The loop member 310 comprises at least 4 sides and at least 4 corners. A first side 341 is a substantially straight side illustrated as a dashed straight line; wherein another embodiment of the first side comprises of a flexible arch 342, wherein the flexible arch is an outward arched side between two adjacent corners of the at least 4 corners of the loop member 310. A second side of the at least 4 sides of the loop member 310 is illustrated in a substantially straight configuration as 351 and a flexible arch comprising the second side is illustrated as 352. A third side of the at least 4 sides of the loop member 310 is illustrated in a substantially straight configuration as 361 and the flexible arch comprising the second side is illustrated as 362. A fourth side of the at least 4 sides of the loop member 310 is illustrated in a substantially straight configuration as 371 and a flexible arch comprising the second side is illustrated as 372. The first side 341 or 342 is connected to the second side 351 or 352 via a first corner 343; the second side 351 or 352 is connected to the third side 361 or 362 via a second corner 353; the third side 361 or 362 is connected to the fourth side 371 or 372 via a third corner 363; the fourth side 371 or 372 is connected to the first side 341 or 342 via a forth corner 373. The steel enclosure 390 secures a first end and a second end to form a flexible steel flat wire loop member 310. Sewing the loop members of embodiment 300 results in a horizontally symmetrical sunshade configuration in 100 or 200 which can be placed upside down and still achieve same amount of coverage. The loop members 310 with at least one arched side are configured to have a higher peak height 391 or peak width (not marked) than the height 390 or width(not marked) between two of the at least 4 sides near the corners.

Figure 4:
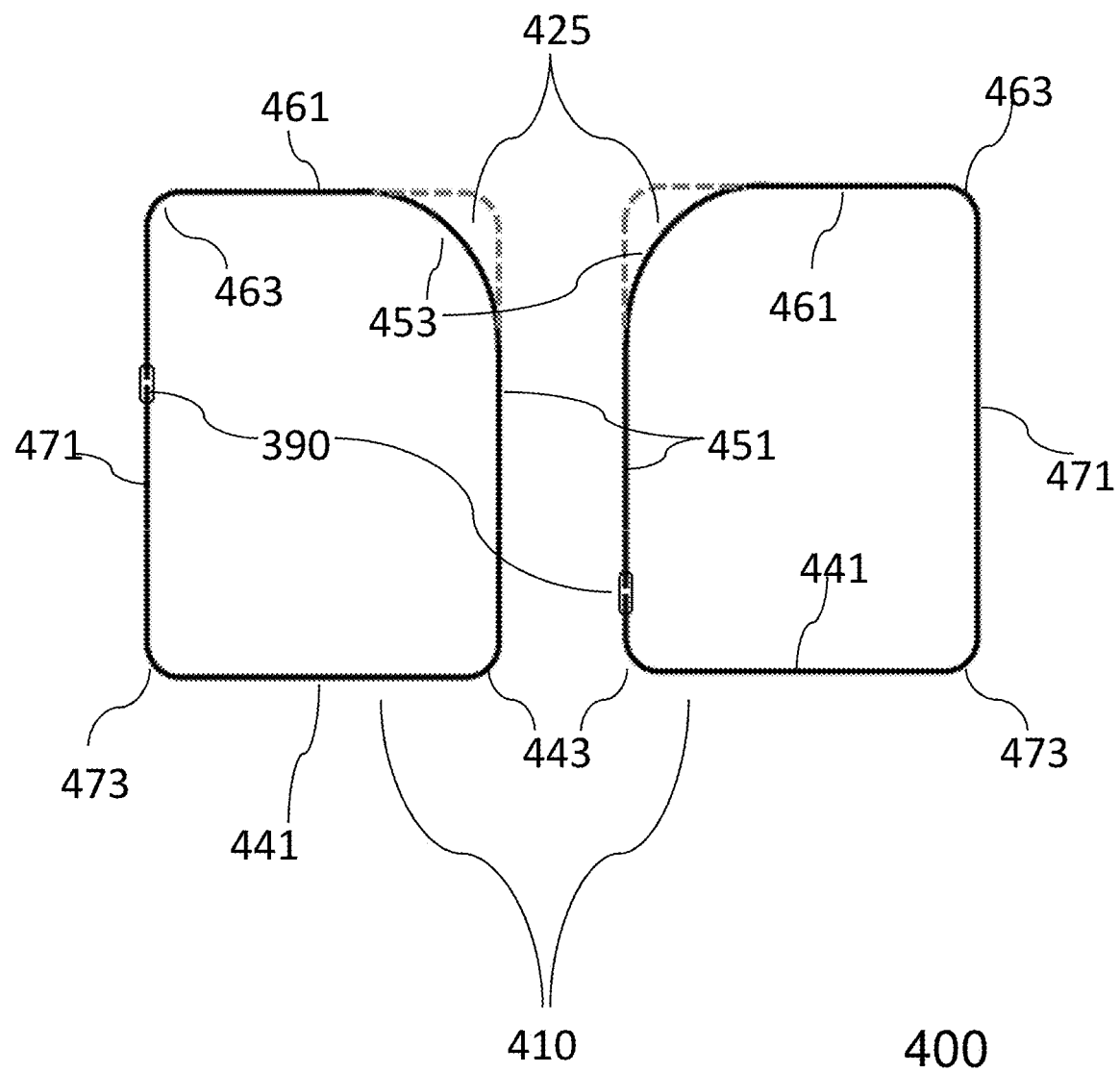
FIG. 4 illustrates a sunshade with a substantially rectangular-shaped loop member sewn on a rectangular fabric. The rectangular-shaped loop member has one corner shaped to bypass the loop member from possibly hitting a rear-view mirror during the installation of the sunshade in the automobile.

FIG. 4 illustrates substantially rectangular loop members 410 in embodiment 400 to be used with sunshade configuration 100 and/or 200. The loop member 410 comprises at least 4 sides and at least 4 corners. A first side 441 is a substantially straight side; A second side of the at least 4 sides of the loop member 410 is illustrated in a substantially straight configuration as 451. A third side of the at least 4 sides of the loop member 410 is illustrated in a substantially straight configuration as 461. A fourth side of the at least 4 sides of the loop member 410 is illustrated in a substantially straight configuration as 471. The first side 441 is connected to the second side 451 via a first corner 443; the second side 451 is connected to the third side 461 via a second corner 453, wherein the second corner comprises a bypass-bend which is at least 1.5 times longer in length than the first corner 443, wherein the second corner 453 bypasses an obstruction in area of 425; the third side 461 is connected to the fourth side 471 via a third corner 463; the fourth side 471 is connected to the first side 441 via a forth corner 473. One or more sides of the loop members 410 can also be replaced by flexible arches. The second corner 453 helps bypass an obstruction present on an interior window the sunshade being placed against. The steel enclosure 390 secures a first end and a second end to form flexible steel flat wire loop members 410.

Figure 5:
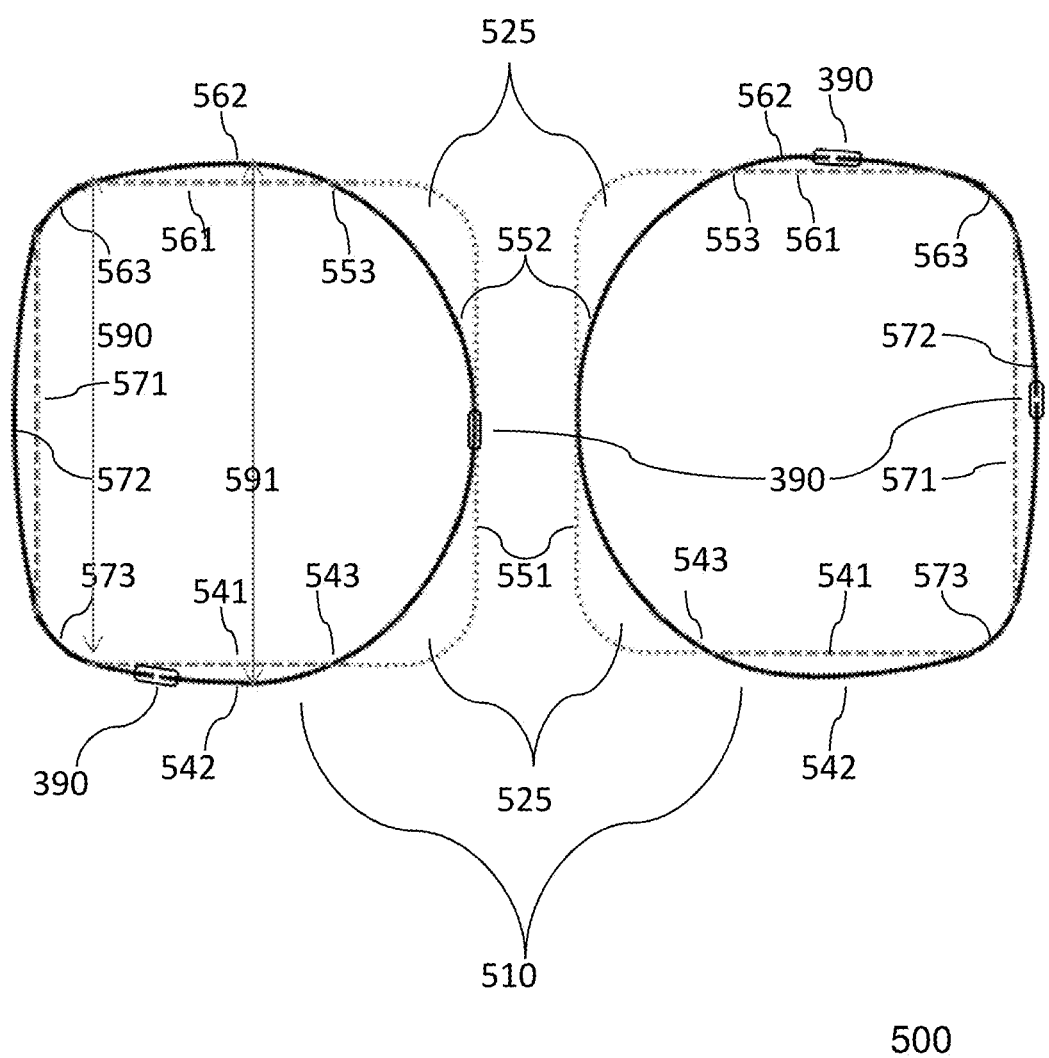
FIG. 5 illustrates a loop member configuration with two bypass bends, a configuration of two loop members with inner two corners being conjoined as one big round corner positioned next to the fabric hinge.

FIG. 5 illustrates a pair of loop members 510 in embodiment 500 to be used with sunshade configuration 100 and/or 200. The loop member 510 comprises at least 4 sides and at least 4 corners. A first side 541 is a substantially straight side illustrated as a dashed straight line; wherein another embodiment of the first side comprises of a flexible arch 542, wherein the flexible arch is an outward arched side between two adjacent corners of the at least 4 corners of the loop member 510. A second side of the at least 4 sides of the loop member 510 is illustrated in a substantially straight configuration as 551 and a flexible arch comprising the second side is illustrated as 552. The second side 552 is substantially arched which forms two bypass-bends 525, one near the first corner 543 and another at the second corner 553. A third side of the at least 4 sides of the loop member 510 is illustrated in a substantially straight configuration as 561 and flexible arch comprising the second side is illustrated as 562. A fourth side of the at least 4 sides of the loop member 510 is illustrated in a substantially straight configuration as 571 and flexible arch comprising the second side is illustrated as 572. The first side 541 or 542 is connected to the second side 551 or 552 via a first corner 543; the second side 551 or 552 is connected to the third side 561 or 562 via a second corner 553; the third side 561 or 562 is connected to the fourth side 571 or 572 via a third corner 563; the fourth side 571 or 572 is connected to the first side 541 or 542 via a forth corner 573. The steel enclosure 390 secures a first end and a second end to form a flexible steel flat wire loop member 510. The loop members 510 with at least one arched side is configured to have a higher peak height 591 or peak width (not marked) than the height 590 or width (not marked) between two of the at least 4 sides near the corners.

Sewing the loop members of embodiment 500 results in a horizontally symmetrical sunshade configuration of 100 or 200 which can be placed upside down and still achieve same amount of coverage.

Figure 6:
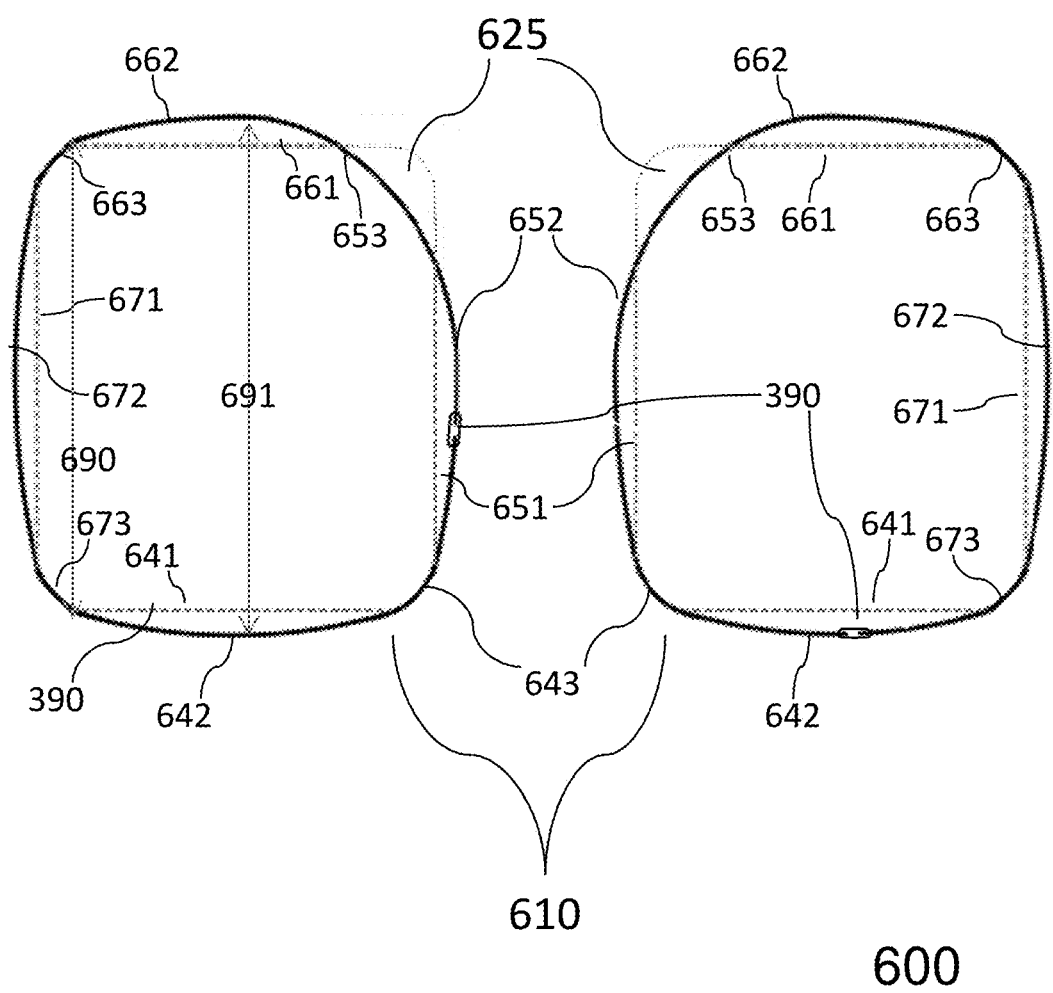
FIG. 6 illustrates a loop member configuration with a single bypass bend, a configuration that has a second corner at least 1.5 times longer than the length of the first corner.

FIG. 6 illustrates a pair of loop members 610 in embodiment 600 to be used with sunshade configuration 100 and/or 200. The loop members 610 comprise at least 4 sides and at least 4 corners. A first side 641 is a substantially straight side illustrated as a dashed straight line; wherein another embodiment of the first side comprises of a flexible arch 642, wherein the flexible arch is an outward arched side between two adjacent corners of the at least 4 corners of each of two the loop members 610. A second side of the at least 4 sides of the loop member 610 is illustrated in a substantially straight configuration as 651 and a flexible arch comprising the second side is illustrated as 652. The second corner 653 forms a single bypass-bend which makes the sunshade configuration 100 or 200 useable windows it's being placed against 625 by bypassing obstruction that might be present on the space 625. A third side of the at least 4 sides of the loop member 610 is illustrated in a substantially straight configuration as 661 and flexible arch comprising the second side is illustrated as 662. A fourth side of the at least 4 sides of the loop member 610 is illustrated in a substantially straight configuration as 671 and a flexible arch comprising the second side is illustrated as 672. The first side 641 or 642 is connected to the second side 651 or 652 via a first corner 643; the second side 651 or 652 is connected to the third side 661 or 662 via a second corner that comprises of the bypass-bend 653, wherein the bypass-bend corner is at least 1.5 times in length than the first corner or any one of rest of the third corner 663 or fourth corner 673 the third side 661 or 662 is connected to the fourth side 671 or 672 via a third corner 663; the fourth side 671 or 672 is connected to the first side 641 or 642 via a forth corner 673. The steel enclosure 390 secures a first end and a second end to form a flexible steel flat wire loop member 610. The loop member 610 provides optimum coverage for an automobile window with an obstruction present in the second corner 653. The loop member 653 in sunshade configuration 100 will not be horizontally symmetrical which will restrict its use only in one orientation for an automotive windshield with an obstruction in the top center. The loop member 653 in sunshade configuration 200 will result in 2 pieces of interior sunshade to be used together. Each of the two pieces can be used vertically (keeping the first side as horizontal) or horizontally by switching the left shade to the right and the right shade to the left side with the fourth side being substantially horizontal lower side. The loop member 610 can be configured in any possible configuration with any of the at least 4 sides being straight or flexible arch. The third corner 663 can also be configured to be shorter or longer in length than the fourth corner 673 of each of the two loop members 610. The loop members 610 with at least one arched side is configured to have a higher peak height 691 or peak width (not marked) than the height 690 or width (not marked) between two of the at least 4 sides near the corners.

Figure 7:
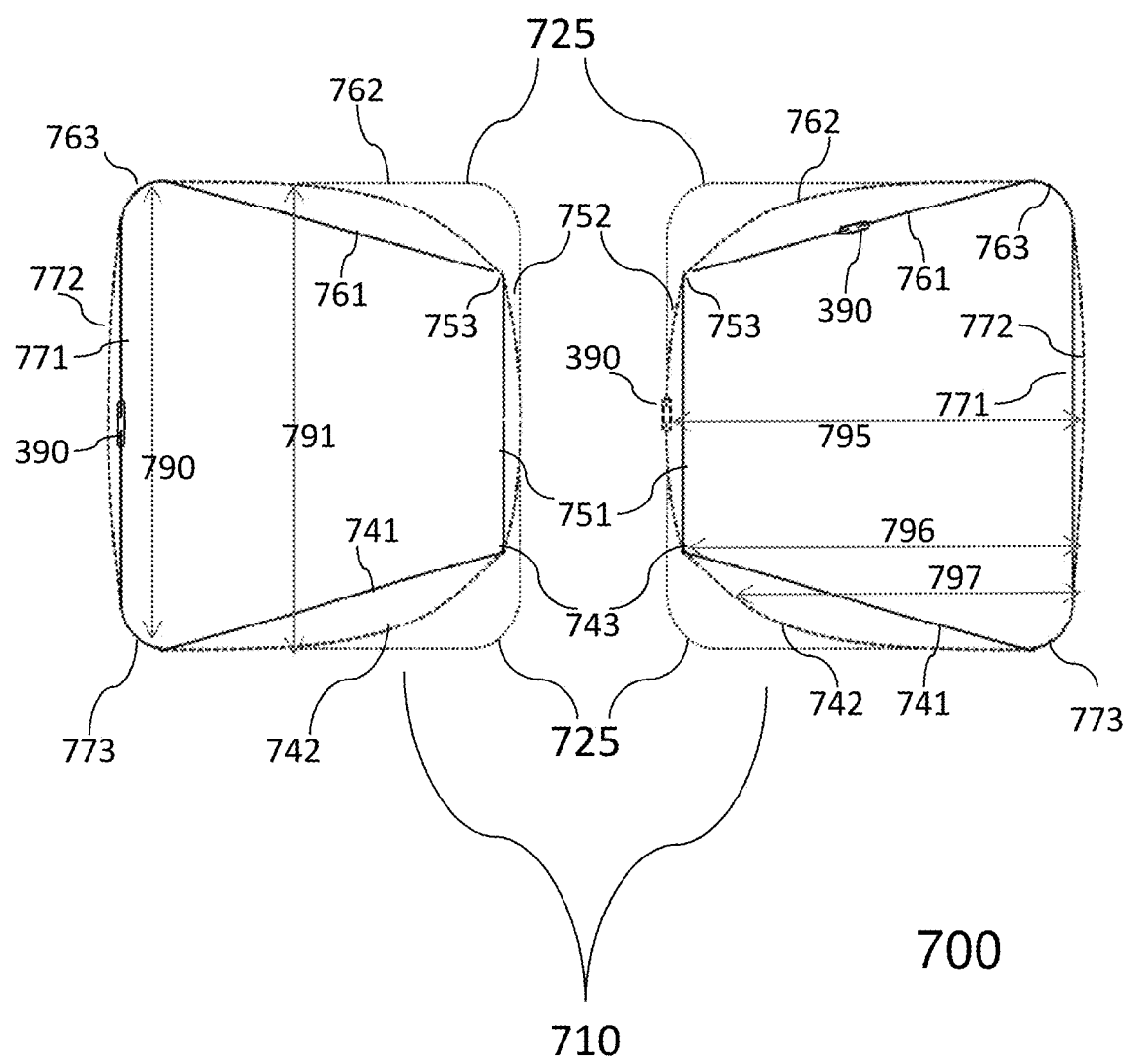
FIG. 7 illustrates a loop member configuration with the second side being substantially shorter in length than the length of the fourth side. The shape of the loop members are configured to bypass hitting a rear-view mirror/any window-mounted obstruction during the installation of the sunshade in the automobile.

FIG. 7 illustrates a pair of loop members 710 in embodiment 700 to be used with sunshade configuration 100 and/or 200. The pair of loop members 710 comprises at least 4 sides and at least 4 corners. A first side 741 is a substantially straight side illustrated as a dashed straight line; wherein another embodiment of the first side comprises of a flexible arch 742, wherein the flexible arch is an outward arched side between two adjacent corners of the at least 4 corners of each of two the loop members 710. A second side of the at least 4 sides of the loop member 710 is illustrated in a substantially straight configuration as 751 and a flexible arch comprising the second side is illustrated as 752. The first corner 743 and the second corner 753 each form a total of two bypass-bends 725 which makes the sunshade configuration 100 or 200 useable by bypassing obstruction that might be present on the window it's being placed against in the space 725. A third side of the at least 4 sides of the loop member 710 is illustrated in a substantially straight configuration as 761 and the flexible arch comprising the second side is illustrated as 762. A fourth side of the at least 4 sides of the loop member 710 is illustrated in a substantially straight configuration as 771 and flexible arch comprising the second side is illustrated as 772. The first side 741 or 742 is connected to the second side 751 or 752 via a first corner or a first bypass-bend 743; the second side 751 or 752 is connected to the third side 761 or 762 via a second corner or a second bypass-bend that comprises of the bypass-bend 753, wherein each of the two bypass-bend corners is at least 1.5 times in length than the third corner 763 or the fourth corner 773. The two bypass-bends, the first bypass-bend, and the second bypass-bend can be configured to be substantially similar in length. The third side 761 or 762 is connected to the fourth side 671 or 672 via a third corner 663; the fourth side 671 or 672 is connected to the first side 641 or 642 via a fourth corner 673. The steel enclosure 390 secures a first end and a second end to form a flexible steel flat wire loop member 610. The loop member 610 provides optimum coverage for an automobile window with an obstruction present in the second corner 653. The loop member 653 in sunshade configuration 100 will not be horizontally symmetrical which will restrict its use only in one orientation for an automotive windshield with an obstruction in the top center. The loop member 653 in sunshade configuration 200 will result in a 2 pieces of interior sunshade to be used together. Each of the two pieces can be used vertically (keeping first side horizontal) or horizontally by switching the left shade to the right and the right shade to the left side with the fourth side being a substantially horizontal lower side. The loop member 610 can be configured in any possible configuration with any of the at least 4 sides being straight or flexible arch.

The loop members 710 are configured to have a lower peak height 791 between the first side 742 and the third side 762 away from the corners 763 and 773 than the height 790 near the 763 and 773 corners.

The loop members 710 is configured to have a lower peak height 791 between the first side 741 and the third side 761 away from the corners 763 and 773 than the height 790 near the 763 and 773 corners.

The loop members 710 is configured to have a higher peak width 795 substantially in the middle of the loop member height between the second side 751 and the third side 762 (comprising flexible arch) than widths 796 or width 797 away from the first corner or the second corner.

The loop members 710 is configured to have a higher peak width 795 substantially in the middle of the loop member height between the second side 752 and the third side 761 (comprising flexible arch) than widths 796 or width 797 away from the first corner or the second corner.

The loop members 710 is configured to have a higher peak width 795 substantially in the middle of the loop member height between the second side 752 and the third side 762 (comprising flexible arch) than widths 796 or width 797 away from the first corner or the second corner.

Figure 8:
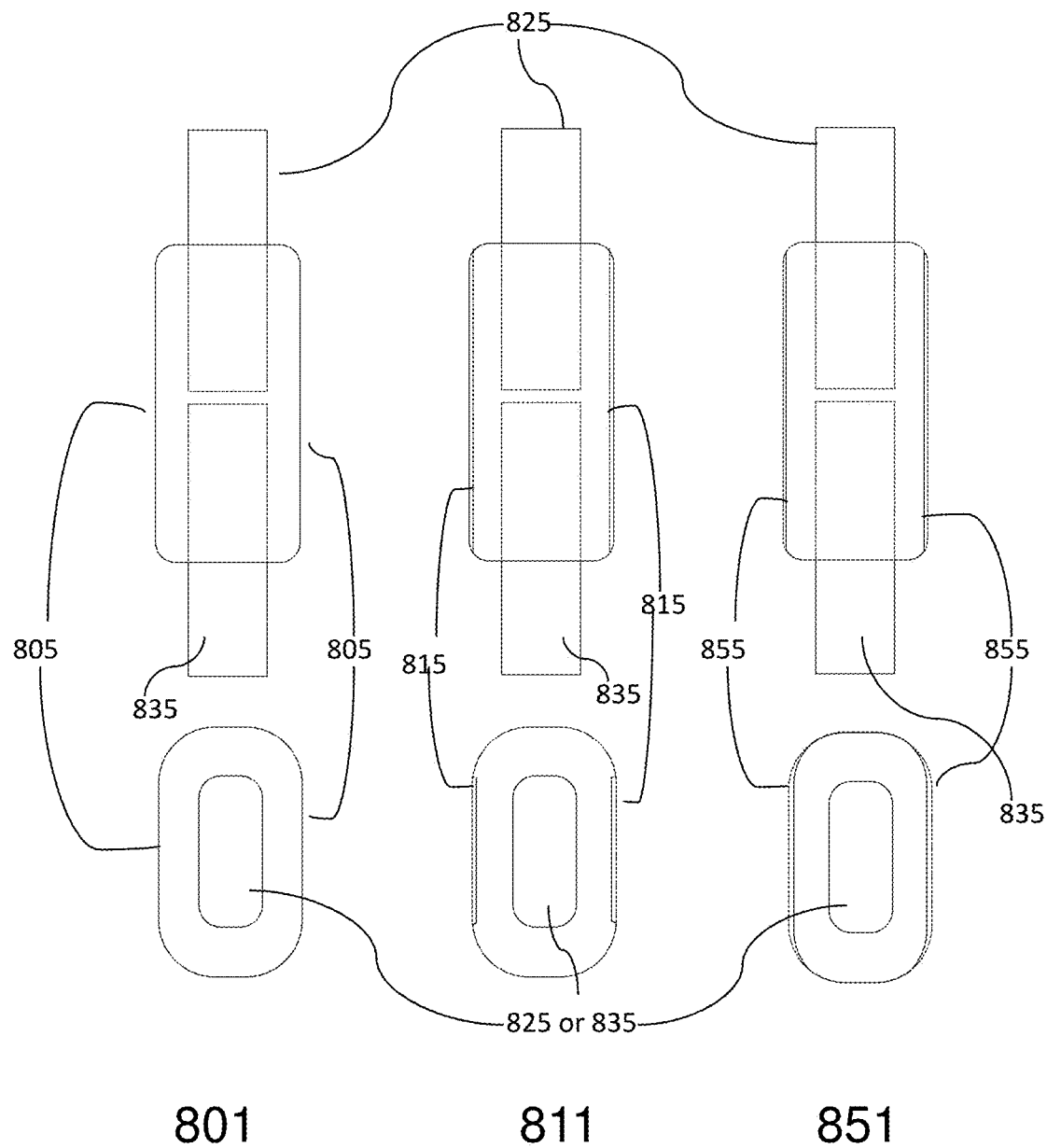
FIG. 8 illustrates a closed-type steel enclosure and clamping embodiments to secure a first end and a second end of the flexible flat wire loop member to a hollow enclosure.

FIG. 8 illustrates clamping method to secure a first end point and a second end point of every of the flexible flat wire loop member embodiment discussed in this application. 801 illustrate the first end point 825 and the second end point 835 inside a steel enclosure with 805 being two width sides of the steel enclosure or hollow enclosure. The steel enclosure's two width sides 815 are pressed only in the middle of the steel enclosure as shown in 811 whereas the entire width sides 855 of the steel enclosures are pressed in the embodiment 851. The steel enclosure can have multiple pressing points across the length of the steel enclosure or can be pressed with one long pressing point across the length of the steel enclosure or can have one long pressing point across the length of the steel enclosure on each of the two steel enclosure width sides.

Figure 9:
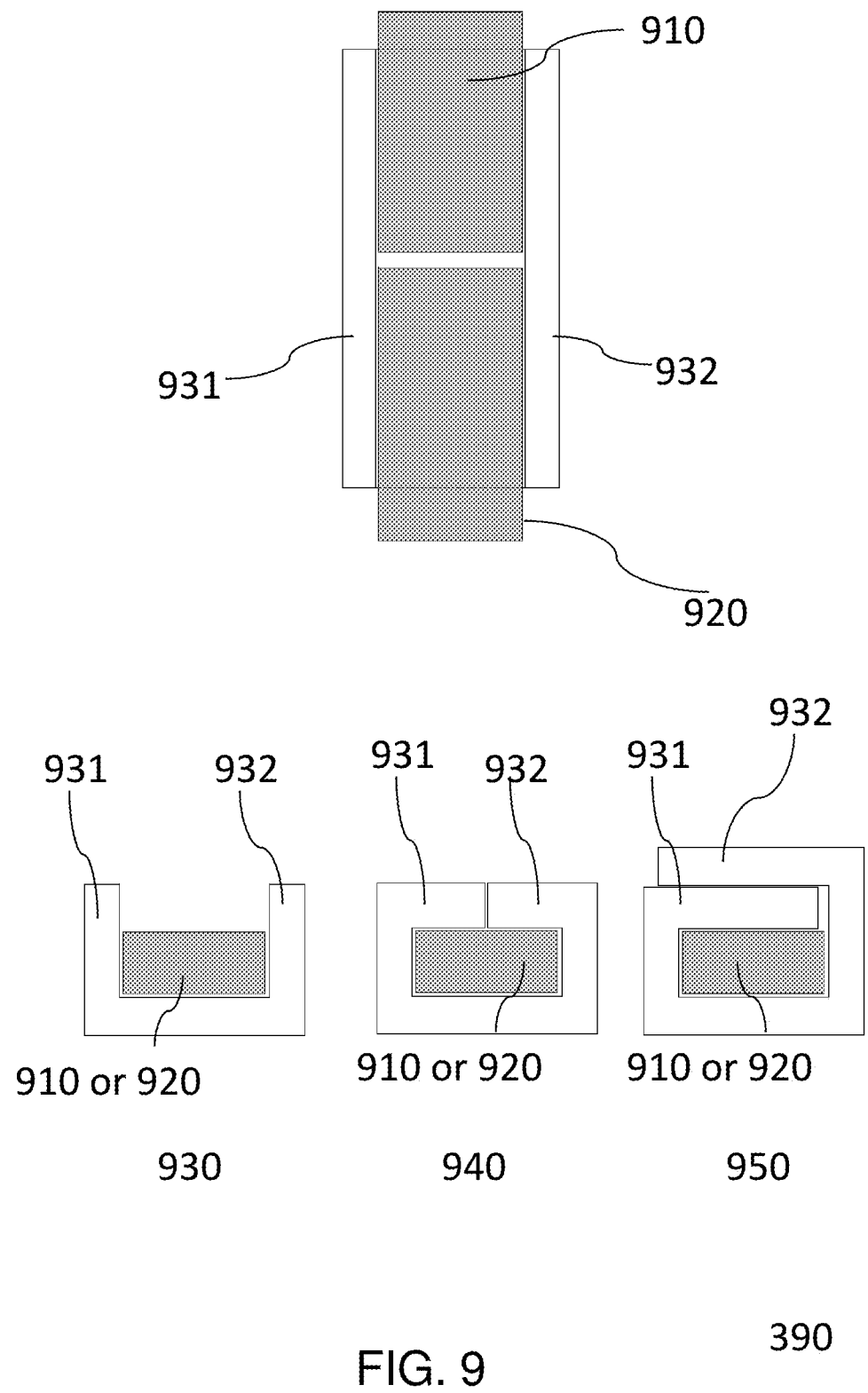
FIG. 9 illustrates an open-type steel enclosure embodiment.

FIG. 9 illustrates another embodiment of the steel hollow enclosure where the steel enclosure is C or U configuration prior to crimping. As shown in 930 the enclosure has a first wall 931 and a second wall 932 which accommodates the first end point 910 and the second end point 920 of the flexible steel flat wire. The clamp can be configured as shown in 940 wherein after crimping the first wall 931 and the second wall 932 do not overlap. The clamp can be configured as shown in 950 wherein after crimping the first wall 931 and the second wall 932 overlap. A crimped steel enclosure can be crimped such that the pressure points are pressed against one or both enclosure width sides (top and bottom walls of 940 and 950). A crimped steel enclosure can be crimped such that the pressure points are pressed against one or both enclosure width sides (top and bottom walls of 940 and 950) wherein two opposite adjacent pressing points are at an offset to one another causing a zig-zag configuration bend in the steel enclosure and possibly causing bends to the first end point and/or the second end point secured inside the steel hollow enclosure. The crimping also can be done by pressing against one of the two steel enclosure width sides with opposite pressing points being on another steel enclosure width side near top and or bottom edges at the steel enclosure thickness sides in embodiments shown in FIG. 8 and FIG. 9.

Figure 10:
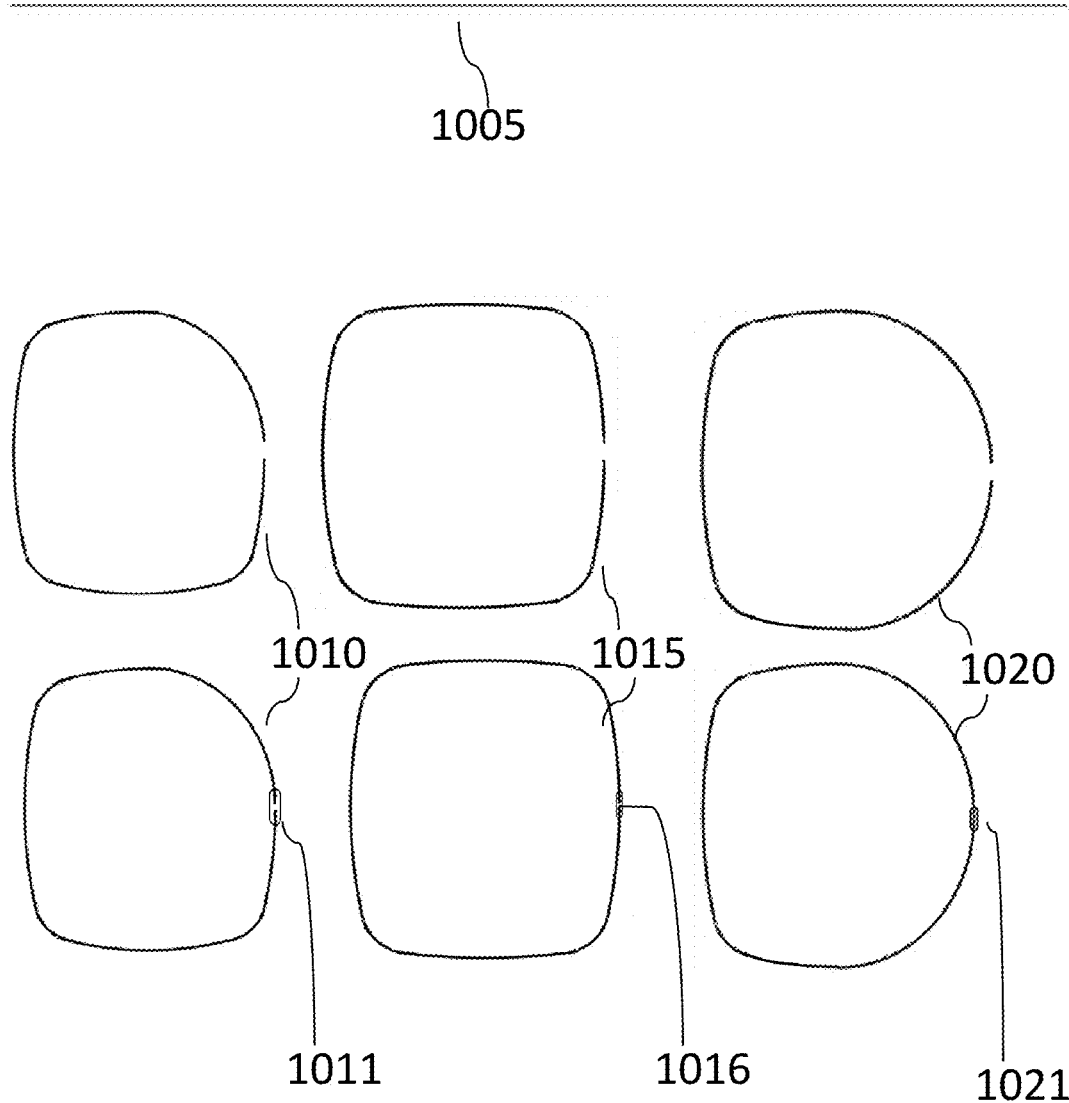
FIG. 10 illustrates a flexible wire used to make a loop member which is pre-bent prior to making a loop member by clamping its two ends.

FIG. 10 illustrates a process of making loop members of various shapes for maximum flexibility and rigidity. In this method, a straight wire is pre-bent fully or partially prior to clamping two ends. This pre-shaped loop member is then sewn to a fabric to make a sunshade. Pre-bent wire provides maximum coverage and flexibility possibly to adopt fitment to the vehicles with similar shaped and/or dimension windows. The pre-shaped loop member also can be used to make a sunshade for a house or any other window wherein a substantially rectangular-shaped loop member is sewn on a fabric. Pre-bent loop member provides better fitment appearance due to loop member having a natural bend to match the shape desired prior to clamping of two open ends of the straight strip. As shown in FIG. 10, 1005 is a straight stripe of flexible steel flat wire from which a loop member is made by clamping two ends of the substantially straight strip. Shape 1010 is formed by bending of the partially or substantially straight strip 1005. Another shape 1015 is formed by bending a straight flexible steel flat wire 1005 into 1015. Another shape 1020 is formed by bending substantially straight flexible steel flat wire 1005 into desired shape. The shape can be of any kind to insure the best fitment possible. This method of pre-bending metal loop members provides better overall fitment. Once pre-bend to the desired shape; two ends of each of the shapes 1010, 1015, and 1020 are crimped using clamps 1011; 1016, and 1021 respectively which then is sewn upon a fabric.

Figure 11:
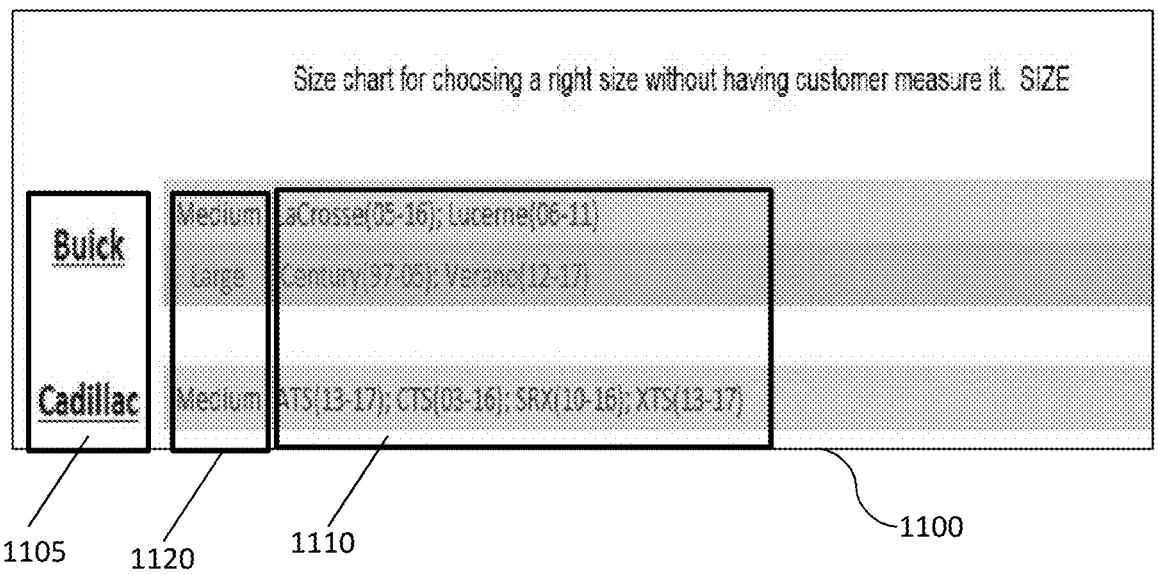
FIG. 11 illustrates a size guidance chart for providing compatibility guidance for the interior windows sunshade.

FIG. 11 illustrates a sizing guidance method 1100. In this method; more than one size of window sunshades are listed under one section 1120 of the same make 1105 wherein for each make multiple different sizes are listed for at least two of the vehicle models in section 1110 with a model year to provide identification of specific vehicle model. In this method, the end user does not need to scroll through multiple sizes of the sunshade in order to locate the year make and model of their vehicle.

FIG. 12 illustrates a sizing guidance method 1200. In this method; multiple vehicle models 1210 of the same make 1205 are short listed with a year 1215 to identify specific vehicle models with the corresponding size 1220 compatible with those vehicle models. In this method, different sizes can be listed in one section 1220 that is compatible with identified vehicle by a combination of 1210 and 1215. This method helps customers locate the vehicle model in one chart once they locate the make of their vehicle models and eliminates need for customer to locate the make in more than one size-charts thus making the compatible size guidance comparatively hassle-free and easy. In this type of compatibility information, all vehicle models from the same make are listed under a one section wherein at least two different sizes are recommended for the at least two vehicles listed under the one section. Guidance method 1100 and 1200 has at least two vehicles from same make shortlisted wherein the at least two vehicles are compatible with different window sunshade sizes.

Figure 13:
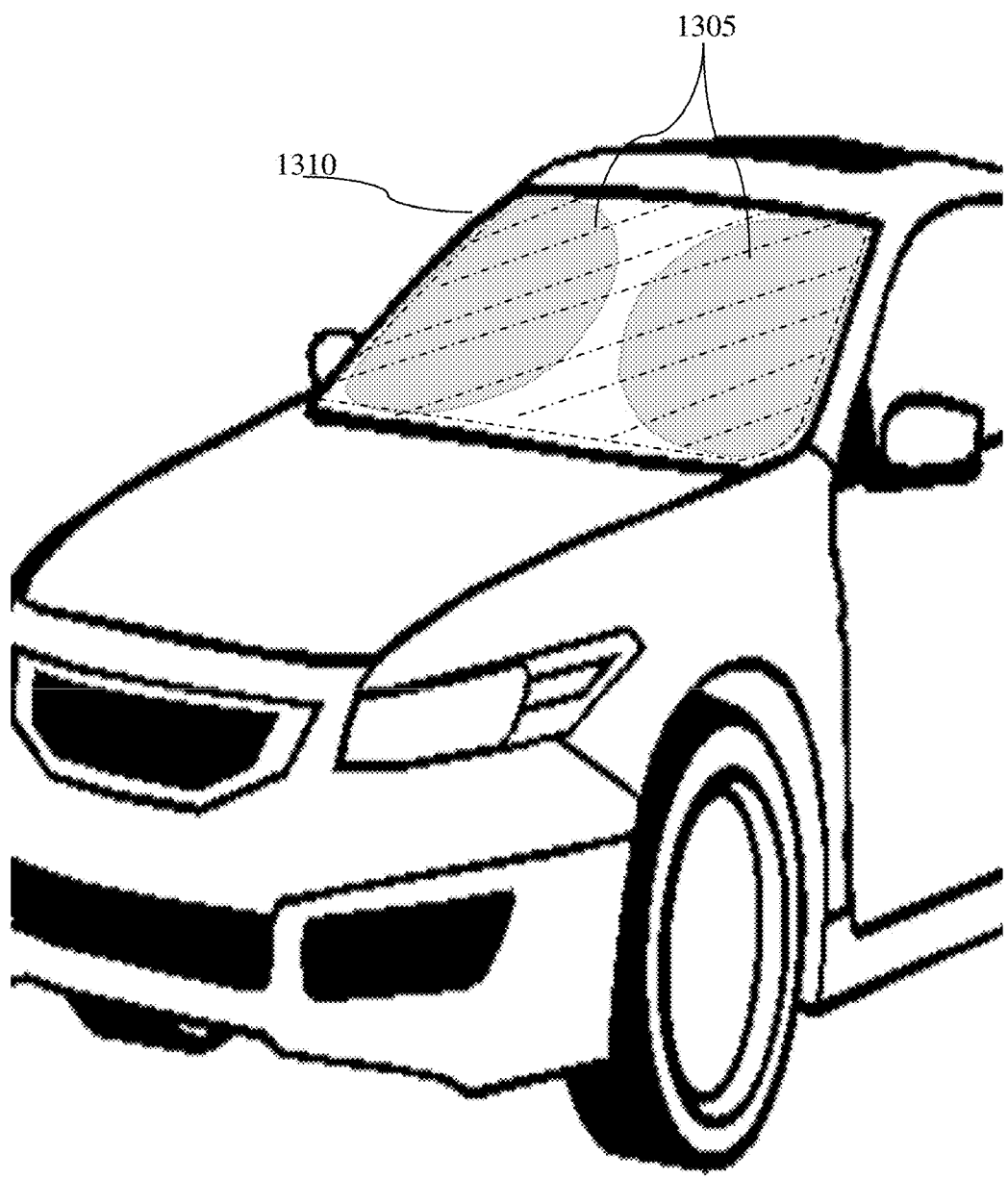
FIG. 13 illustrates a sunshade installed inside a vehicle window.

FIG. 13 illustrates a sunshade installed inside a vehicle window providing a compatibility method wherein the compatibility of the sunshade is based on the height of the loop member 1305 similar to the height of the window 1310 it's being recommended for. The compatibility method also can be based on the adjustable width of the sunshade by partial overlapping and/or extension of both the loop members as shown in FIG. 1. In this guidance method, both the circles are partially overlapped to fit various width windows. By using this compatibility guidance method for this sunshade; one size can be recommended for various widths of windows. The size-guidance for this automotive interior sunshade also can be based upon the height of the loop member being similar to the height of the window. An automobile interior window sunshade comprising at least one loop member sewn on at least one fabric and compatibility information can be provided wherein different compatible sizes are listed in the same size-chart to provide the best coverage possible for any given automobile model. A guidance method also can be based on the height of the loop members. The loop member also can be overlapped to achieve coverage for a variety of widths. A guidance method also can be based on the sunshade's ability to cover various dimensions that provide coverage to the various dimensions of windows. The guidance also can be based on the top and bottom portion of the loop member which is substantially straight and/or arched wherein the distance between top and bottom loop member sides is substantially identical to the height of the window/windshield.

The sunshade mentioned in this invention also can be used for door windows of a vehicle and/or rear windshield/window of the automobile. The sunshade also can be customized and used with any kind of window to block the sunlight including house windows. The fabric of the sunshade can be secured by sewing one side of a Velcro member on the sunshade and sticking another piece of the Velcro member on the window it's being placed against to provide better coverage. The guidance chart shown in the FIGS. 12 and 13 wherein the compatibility guidance is provided for a given sunshade's loop member's height being substantially similar to the height of the vehicle's windshield glass. The fabric between two loop members allows extended coverage wherein the extra fabric also provides material needed to overlap both the loop member to fit a narrow-width windshield glass of a vehicle. The compatibility guidance provided in this invention can be based on minimum and maximum coverage area of the sunshade by overlapping or extension of the two loop members. In 2 pc sunshade designs wherein two pieces are separate can be overlapped to one another partially and the compatibility recommendation will be based on smallest width of the windshield the shade can fit by overlapping the two separate sunshade pieces to the widest vehicle windshield by extension of both the loop members of two separate pieces. The height of each of the two loop members in every guidance method needs to be substantially similar to the height of the windshield it is being recommended for.

Figure 14:
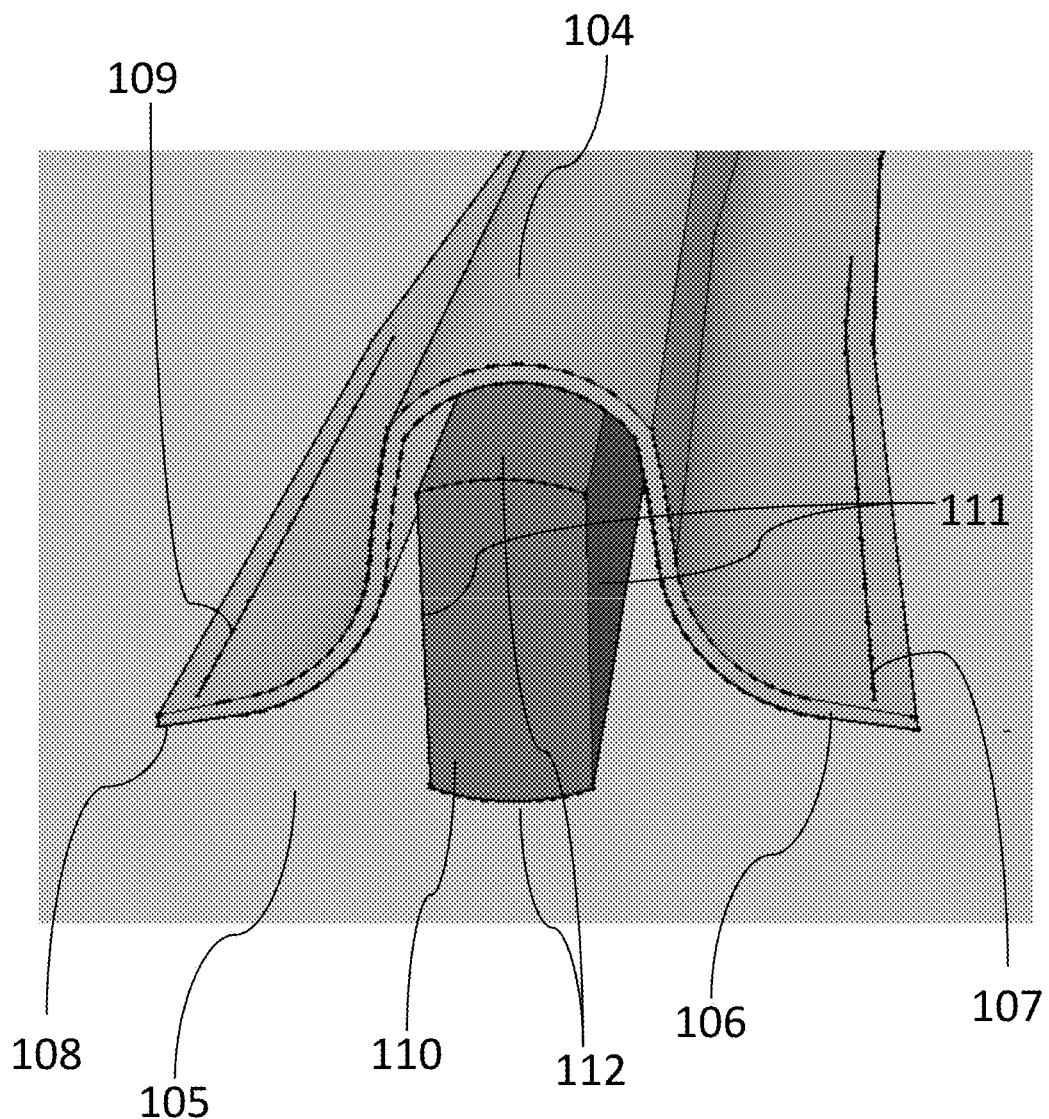
FIG. 14 illustrates a secondary fabric securing the flexible steel flat wire to a sunshade fabric.

FIG. 14 illustrates a cross-section of configuration in which the flexible steel flat wire 110 of any embodiment shown in figures can be secured onto the fabric 105. The flexible steel flat wire configured loop member 110 is placed onto the fabric 105 keeping one of the two steel enclosure thickness sides and one of two wire thickness sides 112 touching the fabric and other facing into the opposite direction. The orientation keeps the two enclosure width sides and two wire width sides 111 perpendicular to the fabric plane. The two flexible loop members 110 is then secured to the fabric 105 with secondary fabric 104 with the two flexible loop members 110 in-between the secondary fabric 104 and the fabric 105. The secondary fabric 104's inner edge 106 is sewn with sewing stitches 107 on the inner side and the outer edge 108 is sewn with sewing stitches 109 on the outer side of the flexible steel flat wire loop member 107. The stress created by the loop member 110 is distributed between two stitches 107 and 109.

The interior window sunshade also can be constructed without pre-bending the flexible steel flat wire. The flexible steel flat wire loop member 110 also can be made by clamping straight wire which turns its shape into round loop due to stress. The round loop then is sewn and guided to make flexible arches or the bypass-bend for the various configurations of the interior window sunshade shown in this application.

The flexible steel flat wire used in the making of any of the embodiments shown in this application needs to have specific carbon content and flexibility requirements for the loop member embodiments to provide sufficient rigidity and flexibility of the interior window sunshade. The carbon content requirement examples are as follows for the flexible steel flat wire.

Flexible steel flat wire being high carbon steel wire >carbon content >0.5%-1.2%;
$0.50\% \leq C < 0.6\%$
$0.60\% \leq C < 0.7\%$
$0.65\% \leq C < 0.75\%$
$0.70\% \leq C < 0.80\%$
$0.80\% \leq C < 0.90\%$
$0.90\% \leq C < 1.0\%$
$1.00\% \leq C < 1.1\%$
$1.10\% \leq C < 1.20\%$ The flexible steel flat wire also requires a wire thickness of 0.5 to 2 mm and wire width being 1 to 5 mm The steel enclosure or steel clamp requires to be made out of low carbon content as shown following. The low carbon content is very essential to provide strengths needed for embodiments in this application.

For hollow enclosure the carbon content: 0.01%-0.30
Non-flexible steel enclosure carbon content should be in a range as shown below:
$0.01\% \leq C < 0.05\%$
$0.05\% \leq C < 0.10\%$
$0.10\% \leq C < 0.15\%$
$0.15\% \leq C < 0.20\%$
$0.25\% \leq C < 0.30\%$ The length of the steel enclosure or clamp needed to be 15 mm to 70 mm.

Each of the two flexible steel wires has two wire width sides and two wire thickness sides, wherein each of the two wire width sides is greater than each of the two wire thickness sides.

The steel enclosure consists of two enclosure width sides and two enclosure thickness sides, wherein each of the two enclosure width sides is greater than each of the two enclosure thickness sides.

The first end point and the second end point of each of the two flexible steel flat wire are accommodated within the hollow enclosure/steel clamp, wherein the zig-zag clamping mechanism/or clamping mechanisms are shown in FIG. 8 and FIG. 9 secures each of the first end point and the second end point to the hollow enclosure/non-flexible/rigid steel clamp independently without overlapping the first end point and the second end point to one another and form each of the at least one flexible steel flat wire loop member. The steel clamp/hollow enclosure mentioned throughout this application is non-flexible or substantially less flexible compared to the flexible steel flat wire. The non-flexible steel clamp/enclosure provides a stronger connection of the non-flexible steel clamp to the first end point and second end point.

An interior sunshade can be offered for a sale with the configuration shown in this application with a size chart that includes compatibility guidance of two different sizes to a vehicle model on the same chart. The chart can be displayed online for the interior window sunshade being offered online. The compatibility guidance also can be provided by the use of a drop-down menu on a webpage. A method for selecting An automobile sunshade compatibility guidance method for a vehicle can also be comprises by providing a compatibility guidance for at least one size of an automobile sunshade, providing a vehicle manufacturer, at least two vehicle models and at least two vehicle years the same maker compatible with the at least one size of the automobile sunshade; providing the at least one size of the automobile sunshade, each of the at least one size of the automobile sunshade includes a fabric covering at least one flexible steel flat wire loop member with a hollow/non-flexible steel enclosure. the hollow enclosure configured with opposite adjacent pressing points being offset to one another to form a zig-zag pattern configured to provide clamping; wherein the fabric has a fabric width, a fabric height and a fabric thickness, wherein both the fabric width and the fabric height are greater than the fabric thickness; wherein each of the at least one flexible steel flat wire loop member consists of a flexible steel flat wire and the hollow enclosure; the flexible steel flat wire having two wire width sides and two wire thickness sides, wherein each of the two wire width sides is greater than each of the two wire thickness sides; the hollow enclosure having two enclosure width sides and two enclosure thickness sides, wherein each of the two enclosure width sides is greater than each of the two enclosure thickness sides; wherein the hollow enclosure accommodates a first end point and a second end point of the flexible steel flat wire within, wherein the enclosure is pressed into form the zig-zag pattern to form bends in the hollow enclosure, wherein each of the opposite adjacent pressing points presses in against only the two enclosure width sides, wherein the zig-zag pattern of the hollow enclosure is configured to secure each of the first end point and the second end point of the flexible steel flat wire to the hollow enclosure independently without overlapping of the first end point and the second end point to one another to form the at least one flexible steel flat wire loop member; wherein the two enclosure thickness sides do not have any of the opposite adjacent pressing points therein, wherein each of the at least one flexible steel flat wire loop member is covered by the fabric; wherein each of the sunshade is configured to be twisted and folded further to cause the at least one flexible steel flat wire loop member to collapse within themselves to form a collapsed state.

An interior window sunshade comprising: two flexible steel wire flat wire loop members, a fabric-hinge, a fabric, a secondary fabric, wherein the fabric is sewn on each of the two flexible loop members, wherein each of the two flexible loop members has at least 4 corners and at least 4 sides, wherein each of the at least 4 sides is substantially straight or outward arched; wherein the secondary fabric secures each of the two flexible steel flat wire loop members on a surface of the fabric with stitches on inside and outside surrounding to each of the two flexible steel flat wire loop members while comprising at least one flexible arch; wherein each of the at least one flexible arch is an outward arched side of the at least 4 sides between two adjacent corners of the at least 4 corners, wherein a first side is a lower side of the at least 4 sides of each of the two flexible steel wire loop members; wherein a second side is directly connected to the first side via a first corner of the at least 4 corners; wherein a third side is directly connected to the second side directly via a second corner of the at least 4 corners; wherein the third side is directly connected to a fourth side of the at least 4 sides via a third corner of the at least 4 corners, wherein the fourth side is substantially vertical outer side and is directly connected to the first side via a fourth corner of the at least 4 corners;

wherein the second side comprises the at least one flexible arch; wherein the first side and the third side are substantially similar in length; wherein each of the two flexible steel flat wire loop members are sewn to the fabric such that each of the two flexible steel flat wire loop members is substantially horizontally symmetrical; wherein the fabric-hinge is a connecting fabric between each of the second sides of the two flexible loop members, wherein the fabric-hinge is 3-14 inches wide, wherein the fabric-hinge is between the two flexible loop members, wherein the width of the fabric-hinge excludes any permanent or detachable additional flexible loop member, wherein the fabric-hinge provides fitment to a wider range of interior window dimensions. The interior window sunshade is configured to be compatible with an automobile window or a building window. At least one of the first side and/or the second side and/or the fourth side comprises of the at least one flexible arch of each of the at least two flexible steel flat wire loop member. The interior window sunshade comprising: a fabric border, wherein the fabric border is on a top side of the third side, a bottom side of the first side and an outer side of the fourth side of each of the two flexible steel flat wire loop members that extends up to 5 inches. Each of the two flexible loop members is configured to have a height and/or width and/or dimensions being up to 3 inches smaller or larger than a window. The fabric hinge is comprises of the fabric, wherein the fabric secures each of the two flexible steel flat wires and comprises the fabric hinge from one piece of the fabric.

An interior window sunshade comprising two flexible steel wire flat wire loop members, a fabric-hinge, a fabric, a secondary fabric, wherein the fabric is sewn on each of the two flexible loop members, wherein each of the two flexible loop members has at least 4 corners and at least 4 sides, wherein each of the at least 4 sides is substantially straight or outward arched; wherein the secondary fabric secures each of the two flexible steel flat wire loop members on to surface of the fabric with stitches on inside and outside surrounding to each of the two flexible steel flat wire loop members while comprising at least one flexible arch; wherein each of the at least one flexible arch is an outward arched side of the at least 4 sides between two adjacent corners of the at least 4 corners, wherein a first side is a lower side of the at least 4 sides of each of the two flexible steel wire loop members; wherein a second side is directly connected to the first side via a first corner of the at least 4 corners; wherein a third side is directly connected to the second side directly via a second corner of the at least 4 corners; wherein the third side is directly connected to a fourth side of the at least 4 sides via a third corner of the at least 4 corners, wherein the fourth side is substantially vertical outer side and is directly connected to the first side via a fourth corner of the at least 4 corners; wherein the second side is substantially shorter in length than the fourth side, wherein each of the two flexible steel flat wire loop members secured onto the surface of the fabric by the secondary fabric is substantially horizontally symmetrical, wherein both the first side and the third side comprises one of the at least one flexible arch; wherein the fabric-hinge is a connecting fabric between each of the second sides of the two flexible loop members, wherein the fabric-hinge is 3-14 inches wide, wherein the fabric-hinge is between the two flexible loop members, wherein the width of the fabric-hinge excludes any permanent or detachable additional flexible loop member, wherein the fabric-hinge provides fitment to a wider range of an interior window dimensions. the interior window sunshade is configured to be compatible with an automobile window or a building window. at least one of the second side and/or the fourth side comprises of the at least one flexible arch of each of the at least two flexible steel flat wire loop members. The interior window sunshade comprises: a fabric border, wherein the fabric border is on a top side of the third side, a bottom side of the first side and an outer side of the fourth side of each of the two flexible steel flat wire loop members that extends up to 5 inches. Each of the two flexible loop members configured to have a height and/or dimensions being up to 3 inches smaller/larger than a window. The fabric hinge is comprises of the fabric, wherein the fabric secures each of the two flexible steel flat wires and comprises the fabric hinge from one piece of the fabric.

An interior window sunshade comprising two flexible steel wire flat wire loop members, a single bypass-bend, a fabric-hinge, a fabric, a secondary fabric, wherein the fabric is sewn on each of the two flexible loop members, wherein each of the two flexible loop members has at least 4 corners and at least 4 sides, wherein each of the at least 4 sides is substantially straight or outward arched; wherein the secondary fabric secures each of the two flexible steel flat wire loop members on to surface of the fabric with stitches on inside and outside surrounding to each of the two flexible steel flat wire loop members while comprising at least one flexible arch; wherein each of the at least one flexible arch is an outward arched side of the at least 4 sides between two adjacent corners of the at least 4 corners, wherein a first side is a lower side of the at least 4 sides of each of the two flexible steel wire loop members; wherein a second side is directly connected to the first side via a first corner of the at least 4 corners; wherein a third side is directly connected to the second side directly via a second corner of the at least 4 corners; wherein the third side is directly connected to a fourth side of the at least 4 sides via a third corner of the at least 4 corners, wherein the fourth side is substantially vertical outer side and is directly connected to the first side via a fourth corner of the at least 4 corners;

wherein the third side is substantially shorter in length than the first side, wherein each of the two flexible steel flat wire loop members is secured onto the surface of the fabric by the secondary fabric, wherein at least the first side of the at least 4 sides comprises the at least one flexible arch, wherein the second corner comprises the single bypass-bend, wherein the bypass-bend is configured to bypass an obstruction that is present at the upper inner corner, wherein the bypass-bend is at least 1.5 times longer in length than the second corner; wherein the fabric-hinge is a connecting fabric between each of the second sides of the two flexible loop members, wherein the fabric-hinge is 3-14 inches wide, wherein the fabric-hinge is between the two flexible loop members, wherein the width of the fabric-hinge excludes any permanent or detachable additional flexible loop member, wherein the fabric-hinge provides fitment to a wider range of interior window dimensions. Wherein the secondary fabric used to secure the flexible steel flat wire loop member is comprises of bias fabric. The secondary fabric also can be configured to secure a portion of the flexible steel flat wire loop member adjacent to the fabric-hinge only and the rest of the flexible steel flat wire also can be secured by folding both ends of the secondary fabric 106 and 108 with stitching that is inside of each of the flexible steel flat wire loop members. Both ends 106 and 108 also can be secured to the fabric using the same stitches to make a sunshade configuration of 200 or rest of the loop member that is not adjacent to the fabric hinge.

The present invention relates to a clamping mechanism of prior application Ser. No. 15/715,775 and using it to secure embodiments shown in the current configuration of loop members. The prior application described the zig-zag metal covering in further detail.

Figure 15:
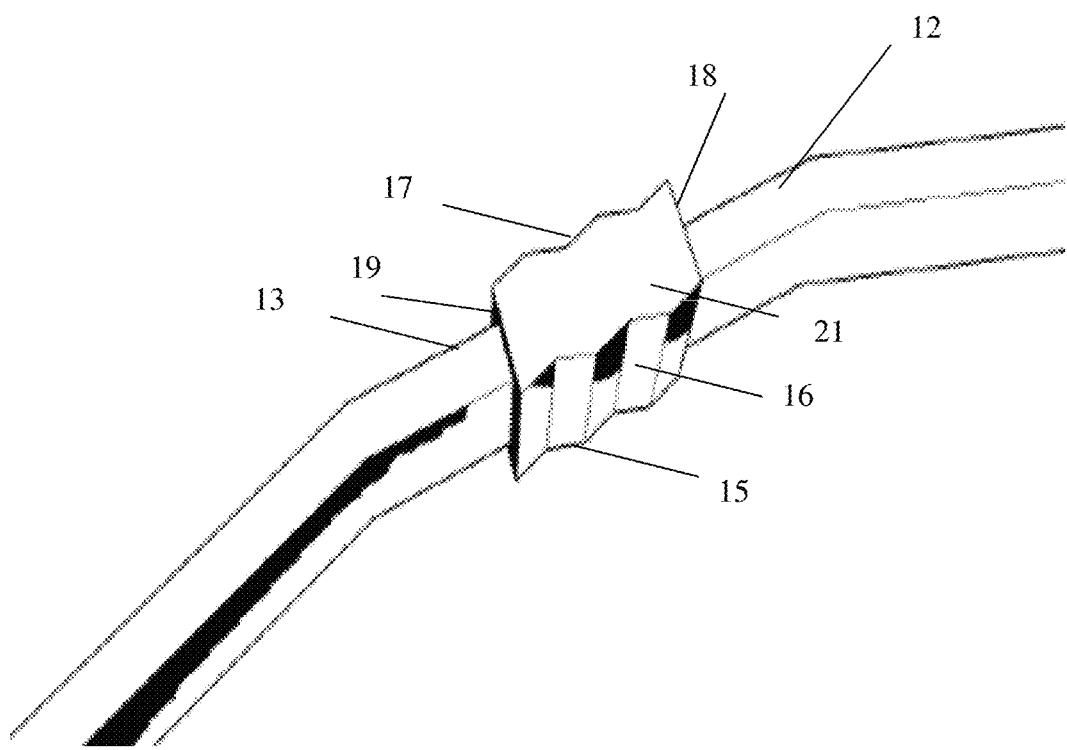
FIG. 15 illustrates an angled view of a clamping mechanism.

A zig-zag clamping of a metal covering of FIG. 15 secures a first end 12 and a second end 13. The metal covering comprises a first side wall 16 and a second side wall 17 with opposite adjacent pressing points at an offset to one another. Additionally, the metal covering comprises a top surface 21, a bottom surface 15, a front wall 18, and a rear wall 19. The metal covering connects the first end 12 and the second end 13 of the flexible loop member in a tight and secure manner.

Figure 16:
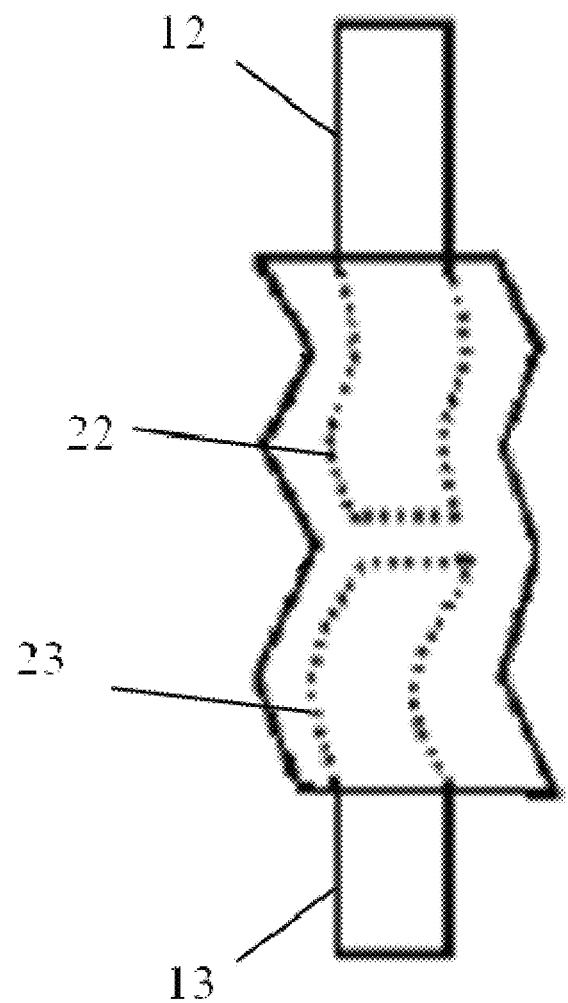
FIG. 16 illustrates the top view the clamping mechanism.

FIG. 16 illustrates the top view of the metal covering securing the first endpoint 22 of the first end 12 and the second endpoint 23 of the second end 13 inside it. The first endpoint 22 and the second endpoint 23 do not contact one another.

What is claimed is:

1. An interior window sunshade compatibility guidance method comprising the following steps:
   a. providing an interior window sunshade comprising two flexible steel flat wire loop members, each flexible steel flat wire loop member secured to a fabric panel by a secondary fabric member;
      wherein each of the two flexible steel flat wire loop members comprises:
         at least four corners and at least four sides, wherein at least three sides of the at least four sides are substantially straight or outwardly arched;
      a flexible steel flat wire comprising a first end and a second end secured by a metal covering, the metal covering having two covering width surfaces and two covering thickness surfaces, each of the two covering width surfaces being larger than each of the two covering thickness surfaces, wherein the metal covering is secured between the fabric panel and the secondary fabric member;
      at least two opposite adjacent pressing points on the two covering width surfaces configured to protrude into a space defined within the metal covering to secure the first end and the second end of the flexible steel flat wire, wherein the metal covering secures the first end and the second end of the flexible steel flat wire within the space without overlapping the first end and the second end over each another, wherein the first end and the second end do not contact each other within the metal covering, and the metal covering substantially entirely surrounds a perimeter of each of the first end and the second end;
      wherein at least one of the at least two opposite adjacent pressing points is disposed on one of the two covering width surfaces and at least another of the at least two opposite adjacent pressing points is disposed on another of the two covering width surfaces;
      wherein a first side of the at least four sides is a lower side of the at least four sides;
      wherein a second side of the at least four sides is directly connected to the first side via a first corner of the at least four corners, wherein the second side is substantially outwardly arched;
      wherein a third side of the at least four sides is directly connected to the second side via a second corner of the at least four corners, wherein the third side is substantially outwardly arched and is an upper side of the at least four sides;
      wherein the third side is directly connected to a fourth side of the at least four sides via a third corner of the at least four corners;
      wherein the fourth side is directly connected to the first side via a fourth corner of the at least four corners;
      wherein each of the at least four corners are outwardly arched;
      wherein at least one of the two flexible steel flat wire loop members is secured onto the fabric panel by sewing the secondary fabric member on to the fabric panel;
      wherein each of the two flexible steel flat wire loop members is configured to be twisted and folded to cause the two flexible steel flat wire loop members to collapse within themselves to form a collapsed state;
   b. providing compatibility guidance for the interior window sunshade, wherein the compatibility guidance provides compatibility of the interior window sunshade to a window of a vehicle model or to at least two dimensions of a building window.

2. The method of claim 1, wherein the interior window sunshade comprises a fabric border, wherein the fabric border is configured to surround an outside of at least the first side, the second side and the third side of each of the two flexible steel flat wire loop members.

3. The method of claim 1, wherein the compatibility guidance is provided as a size-chart on a website and/or a product packaging.

4. The method of claim 1, wherein the interior window sunshade is configured to be compatible with an automobile window or a building window.

5. The method of claim 1, wherein the flexible steel flat wire of each of the two flexible steel flat wire loop members has a pre-bent portion prior to forming a loop.

6. An interior window sunshade compatibility guidance method comprising the following steps:
 a. providing an interior window sunshade comprising two flexible steel flat wire loop members, each flexible steel flat wire loop member secured to a fabric panel by a secondary fabric member;
  wherein each of the two flexible steel flat wire loop members comprises:
   at least four corners and at least four sides, wherein at least two sides of the at least four sides are substantially straight or outwardly arched;
   a flexible steel flat wire comprising a first end and a second end secured by a metal covering, the metal covering having two covering width surfaces and two covering thickness surfaces, each of the two covering width surfaces being larger than each of the two covering thickness surfaces, wherein the metal covering is secured between the fabric panel and the secondary fabric member;
   at least two opposite adjacent pressing points on the two covering width surfaces configured to protrude into a space defined within the metal covering to secure the first end and the second end of the flexible steel flat wire, wherein the metal covering secures the first end and the second end of the flexible steel flat wire within the space without overlapping the first end and the second end over each another, wherein the first end and the second end do not contact each other within the metal covering, and the metal covering substantially entirely surrounds a perimeter of each of the first end and the second end;
  wherein at least one of the at least two opposite adjacent pressing points is disposed on one of the two covering width surfaces and at least another of the at least two opposite adjacent pressing points is disposed on another of the two covering width surfaces;
  wherein a first side of the at least four sides is a lower side of the at least four sides, wherein the first side is outwardly arched;
  wherein a second side of the at least four sides is directly connected to the first side via a first corner of the at least four corners, wherein the second side is outwardly arched and is more arched than the first side;
  wherein a third side of the at least four sides is directly connected to the second side via a second corner of the at least four corners, wherein the third side is substantially straight or outwardly arched and is an upper side of the at least four sides;
  wherein a fourth side of the at least four sides is directly connected to the third via a third corner of the at least four corners, wherein the fourth side is oriented substantially vertically;
  wherein the fourth side is directly connected to the first side via a fourth corner of the at least four corners;
  wherein each of the at least four corners are outwardly arched;
  wherein at least one of the two flexible steel flat wire loop members is secured onto the fabric panel by sewing the secondary fabric member on to the fabric panel;
  wherein each of the two flexible steel flat wire loop members is configured to be twisted and folded to cause the two flexible steel flat wire loop members to collapse within themselves to form a collapsed state;
 b. providing compatibility guidance for the interior window sunshade, wherein the compatibility guidance provides compatibility of the interior window sunshade to a window of a vehicle model or to at least two dimensions of a building window.

7. The method of claim 6, wherein the interior window sunshade comprises a fabric border, wherein the fabric border is configured to surround an outside of at least the first side, the third side and the fourth side of each of the two flexible steel flat wire loop members.

8. The method of claim 6, wherein the compatibility guidance is provided as a size-chart on a website and/or a product packaging.

9. The method of claim 6, wherein the interior window sunshade is configured to be compatible with an automobile window or a building window.

10. The method of claim 6, wherein the flexible steel flat wire of each of the two flexible steel flat wire loop members has a pre-bent portion prior to forming a loop.

11. An interior window sunshade compatibility guidance method comprising the following steps:
 a. providing an interior window sunshade comprising at least one flexible steel flat wire loop member, each of the at least one flexible steel flat wire loop member secured to a fabric panel by a secondary fabric member;
  wherein each of the at least one flexible steel flat wire loop member comprises:
   at least four corners and at least four sides, wherein at least four sides of the at least four sides are substantially straight or outwardly arched;
   a flexible steel flat wire comprising a first end and a second end secured by a metal covering, the metal covering having two covering width surfaces and two covering thickness surfaces, each of the two covering width surfaces being larger than each of the two covering thickness surfaces, wherein the metal covering is secured between the fabric panel and the secondary fabric member;
   at least two opposite adjacent pressing points on the two covering width surfaces configured to protrude into a space defined within the metal covering to secure the first end and the second end of the flexible steel flat wire, wherein the metal covering secures the first end and the second end of the flexible steel flat wire within the space without overlapping the first end and the second end over each another, wherein the first end and the second end do not contact each other within the metal covering, and the metal covering substantially entirely surrounds a perimeter of each of the first end and the second end;
  wherein at least one of the at least two opposite adjacent pressing points is disposed on one of the two covering width surfaces and at least another of the at least two opposite adjacent pressing points is disposed on another of the two covering width surfaces;

wherein a first side of the at least four sides is a substantially horizontal lower side of the at least four sides;

wherein a second side of the at least four sides is directly connected to the first side via a first corner of the at least four corners, wherein the second side is substantially vertical;

wherein a third side of the at least four sides is directly connected to the second side via a second corner of the at least four corners, wherein the third side is a substantially horizontal upper side of the at least four sides;

wherein a fourth side of the at least four sides is directly connected to the third side via a third corner of the at least four corners, wherein the fourth side is substantially vertical;

wherein the fourth side is directly connected to the first side via a fourth corner of the at least four corners;

wherein each of the at least four corners are outwardly arched;

wherein each of the at least one flexible steel flat wire loop member is secured onto the fabric panel by sewing the secondary fabric member on to the fabric panel;

wherein each of the at least one flexible steel flat wire loop member is configured to be twisted and folded to cause each of the at least one flexible steel flat wire loop member to collapse within itself to form a collapsed state;

b. providing compatibility guidance for the interior window sunshade, wherein the compatibility guidance provides compatibility of the interior window sunshade to a window of a vehicle model or to at least two dimensions of a building window.

12. The method of claim 11, wherein the fabric panel is semi-transparent or capable of substantially blocking sunlight.

13. The method of claim 11, wherein the at least one flexible steel flat wire loop member comprises at least a second flexible steel flat wire loop member, each of the flexible steel flat wire loop members being secured to the fabric panel.

14. The method of claim 11, wherein the interior window sunshade is configured to be compatible with an automobile window or a building window.

15. The method of claim 11, wherein the flexible steel flat wire has a pre-bent portion prior to forming a loop.

16. An interior window sunshade compatibility guidance method comprising the following steps:

a. providing an interior window sunshade comprising at least one flexible steel flat wire loop member, each of the at least one flexible steel flat wire loop member secured to a fabric panel by a secondary fabric member;

wherein each of the at least one flexible steel flat wire loop member comprises:

at least four corners and at least four sides, wherein at least two sides of the at least four sides are substantially straight or outwardly arched;

a flexible steel flat wire comprising a first end and a second end secured by a metal covering, the metal covering having two covering width surfaces and two covering thickness surfaces, each of the two covering width surfaces being larger than each of the two covering thickness surfaces, wherein the metal covering is secured between the fabric panel and the secondary fabric member;

at least two opposite adjacent pressing points on the two covering width surfaces configured to protrude into a space defined within the metal covering to secure the first end and the second end of the flexible steel flat wire, wherein the metal covering secures the first end and the second end of the flexible steel flat wire within the space without overlapping the first end and the second end over each another, wherein the first end and the second end do not contact each other within the metal covering, and the metal covering substantially entirely surrounds a perimeter of each of the first end and the second end;

wherein at least one of the at least two opposite adjacent pressing points is disposed on one of the two covering width surfaces and at least another of the at least two opposite adjacent pressing points is disposed on another of the two covering width surfaces;

wherein a first side of the at least four sides is a lower side of the at least four sides, wherein the first side is outwardly arched;

wherein a second side of the at least four sides is directly connected to the first side via a first corner of the at least four corners, wherein the second side is longer in length than the first side;

wherein a third side of the at least four sides is directly connected to the second side via a second corner of the at least four corners, wherein the third side is substantially straight or outwardly arched and is an upper side of the at least four sides;

wherein a fourth side of the at least four sides is directly connected to the third side via a third corner of the at least four corners, wherein the fourth side is substantially straight or outwardly arched and is substantially vertical;

wherein the fourth side is directly connected to the first side via a fourth corner of the at least four corners;

wherein each of the at least four corners are outwardly arched;

wherein each of the at least one flexible steel flat wire loop member is secured onto the fabric panel by sewing the secondary fabric member on to the fabric panel;

wherein each of the at least one flexible steel flat wire loop member is configured to be twisted and folded to cause each of the at least one flexible steel flat wire loop member to collapse within itself to form a collapsed state;

b. providing compatibility guidance for the interior window sunshade, wherein the compatibility guidance provides compatibility of the interior window sunshade to a window of a vehicle model or to at least two dimensions of a building window.

17. The method of claim 16, wherein the interior window sunshade comprises a fabric border, wherein the fabric border is configured to surround an outside of at least the first side, the third side and the fourth side of each of the at least one flexible steel flat wire loop member.

18. The method of claim 16, wherein the compatibility guidance is provided as a size-chart on a website and/or a product packaging.

19. The method of claim 16, wherein the interior window sunshade is configured to be compatible with an automobile window or a building window.

20. The method of claim 16, wherein the flexible steel flat wire has a pre-bent portion prior to forming a loop.

\* \* \* \* \*